US008189519B2

(12) United States Patent
Motegi et al.

(10) Patent No.: US 8,189,519 B2
(45) Date of Patent: May 29, 2012

(54) CHANNEL ASSIGNMENT APPARATUS AND CHANNEL ASSIGNMENT METHOD (75) Inventors: Masayuki Motegi, Yokohama (JP); Yasuhiro Kato, Yokohama (JP); Minami Ishii, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 531 days.

(21) Appl. No.: 11/917,871

(22) PCT Filed: Jun. 16, 2006

(86) PCT No.: PCT/JP2006/312175
§ 371 (c)(1),
(2), (4) Date: Sep. 3, 2008

(87) PCT Pub. No.: WO2006/135063
PCT Pub. Date: Dec. 21, 2006

(65) Prior Publication Data
US 2009/0088173 A1 Apr. 2, 2009

(30) Foreign Application Priority Data

Jun. 17, 2005 (JP) .................................. 2005-178530

(51) Int. Cl.
*H04W 4/00* (2009.01)
(52) U.S. Cl. ......... 370/329; 370/328; 370/341; 370/390
(58) Field of Classification Search .......................... None
See application file for complete search history.

(56) References Cited

U.S. PATENT DOCUMENTS

| 5,081,704 | A | * | 1/1992 | Umeda et al. ................. 455/450 |
| 5,896,376 | A | | 4/1999 | Alperovich et al. |
| 6,370,128 | B1 | * | 4/2002 | Raitola ......................... 370/329 |
| 6,459,680 | B1 | | 10/2002 | Alperovich et al. |
| 6,879,573 | B1 | | 4/2005 | Huo |
| 2001/0043576 | A1 | * | 11/2001 | Terry ............................ 370/328 |
| 2003/0203736 | A1 | | 10/2003 | Chi et al. |
| 2004/0062321 | A1 | * | 4/2004 | Nakamura et al. ............ 375/295 |
| 2004/0090947 | A1 | * | 5/2004 | Wilborn et al. ................ 370/345 |
| 2005/0054331 | A1 | | 3/2005 | Balachandran et al. |

(Continued)

FOREIGN PATENT DOCUMENTS

CN 1246261 A 3/2000

(Continued)

OTHER PUBLICATIONS

Association of Radio Industries and Businesses, "RCR STD-27 Personal Digital Cellular Telecommunication Systesm", Mar. 31, 2001, pp. 33-40 (24 pages).

(Continued)

*Primary Examiner* — Jae Y Lee
(74) *Attorney, Agent, or Firm* — Osha • Liang LLP (57) ABSTRACT The logical channels are made to include a logical channel for control and a logical channel for data transmission, the radio physical channel are made to be commonly used for a plurality of logical channels, and one logical channel is made to have a correspondence relationship with one radio physical channel, and the channel assignment apparatus includes: traffic monitoring detection means that detects occurrence of traffic of the logical channels; and logical channel assignment means that, according to occurrence of the traffic of the logical channels, sequentially assigns required resources on the radio physical channel to the logical channels, so that the object is achieved.

10 Claims, 8 Drawing Sheets

U.S. PATENT DOCUMENTS

2006/0089141 A1* 4/2006 Ho et al. .................. 455/436

FOREIGN PATENT DOCUMENTS

| CN | 1328759 | 12/2001 |
|---|---|---|
| EP | 1 005 243 A1 | 5/2000 |
| EP | 1189366 | 3/2002 |
| JP | 2002-152159 | 5/2002 |
| JP | 2002-531029 | 9/2002 |
| JP | 2003-229901 | 8/2003 |
| JP | 2005-86818 | 3/2005 |
| WO | 9909775 | 2/1999 |
| WO | 0016433 A2 | 3/2000 |

OTHER PUBLICATIONS

Russian Office Action for Application No. 2008100769/09, mailed on May 19, 2010 (6 pages).

Mexican Office Action for Application No. MX/a/2007/016026, mailed on May 4, 2010 (5 pages).

Taiwanese Office Action for Taiwanese Application No. 95121658, mailed on May 11, 2009 (4 pages).

esp@cenet patent abstract for Chinese Publication No. 1328759, Publication date Dec. 26, 2001 (1 page).

Islam, M.I. et al., "Channel Allocation of Mobile Cellular Network Based on Graph Theory", TENCON 2004. 2004 IEEE Region 10 Conference vol. B, Nov. 21-24, 2004, vol. 2, Digital Object Identifier 10.1109/TENCON.2004.1414649 pp. 529-532 (4 pages).

Buczynski, J. et al., "Performance of a DS-CDMA System with Dynamic Channel Allocation and Soft Handover", Spread Spectrum Techniques and Applications, 1998. Proceedings., 1998 IEEE 5th International Symposium on vol. 2, Sep. 2-4, 1998, vol. 2, Digital Object Identifier 10.1109/ISSSTA.1998.723818 pp. 420-424 (5 pages).

International Search Report (English) for PCT/JP2006/312175 mailed Sep. 19, 2006 (2 pages).

Written Opinion of International Searching Authority (Japanese) dated Sep. 19, 2006 (3 pages).

"Radio Interface Protocol Architecture" 3GPP TS 25.301 V6.2.0 (Mar. 2005) (48 pages).

"Medium Access Control (MAC) Protocol Specification" 3GPP TS 25.321 V6.4.0 (Mar. 2005) (74 pages).

Chinese Office Action for Application No. 200680025608.3, mailed on Oct. 29, 2010 (10 pages).

Extended European Search Report for Application No. 06766854.1, mailed on Dec. 1, 2011 (7 pages).

* cited by examiner

CHANNEL ASSIGNMENT APPARATUS AND CHANNEL ASSIGNMENT METHOD

TECHNICAL FIELD

The present invention relates to a channel assignment apparatus and a channel assignment method. More particularly, the present invention relates to a technique for dynamically assigning required resources on a radio physical channel in which there is correspondence relationship between logical channels and the radio channel.

BACKGROUND ART

A channel assignment method in W-CDMA is described (refer to non-patent documents 1 and 2, for example).

Figure 1:
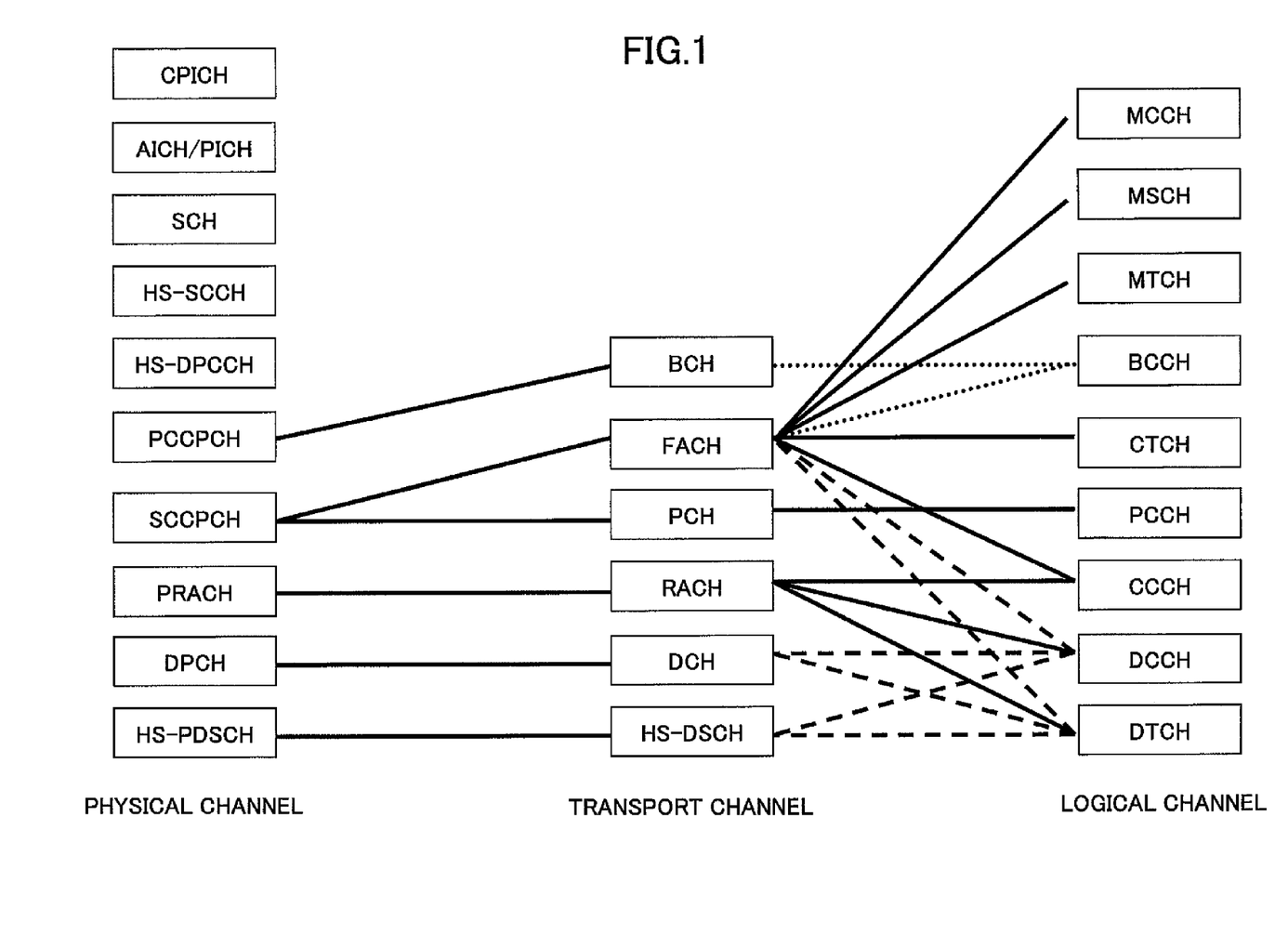
FIG. 1 is a schematic diagram showing channel assignment in W-CDMA.

In W-CDMA, as shown in FIG. 1, there are three types of function channels, which are, logical channels that are function channels defined between RLC and MAC, transport channels that are function channels defined between MAC and Physical, and physical channels that are function channels defined in Physical layer.

The logical channels include BCCH, PCCH, CCCH, MCCH, DCCH, MSCH, MTCH and DTCH etc. CCH is used for control, TCH is used for traffic communication, and MCCH, MSCH and MTCH are used for MBMS.

The transport channels include BCH, PCH, FACH, RACH, DCH and HS-DSCH etc. BCH, PCH, FACH and HS-DSCH are downlink transport channels, RACH is an uplink transport channel, and DCH is a bidirectional transport channel used in uplink and downlink.

The physical channels include PCCPCH, SCCPCH, DPCH, PRACH, HS-PDSCH, SCH, CPICH, AICH, PICH, HS-SCCH and HS-DPCCH etc. PCCPCH is a downlink physical channel and is prepared for transmitting BCH (broadcast information). SCCPCH is a downlink physical channel and is prepared for transmitting FACH and PCH (paging information). In W-CDMA, SCCPCH (to which FACH and PCH are mapped) is provided as a radio physical channel to which almost all of the logical channels can be mapped.

By the way, in a connection sequence, a UE is identified by an identifier (TMSI) in a L3 (RRC) layer. Therefore, since there is no individual correspondence relationship in L2 (UE cannot be identified in a L2 level), the CCCH (common control channel) is used as the logical channel. After establishment of the RRC connection, since an identifier (C- or H-RNTI) in L2 is assigned from RAN, it is identified in L2 after that, and the logical channel becomes DCCH (dedicated control channel).

RRC connection establishment is described. "RRC Connection Request" that is a control signal when establishing the RRC connection is transmitted using CCCH as a logical channel and using PRACH as a radio physical channel. In addition, also "RRC Connection Setup" is transmitted using CCCH as a logical channel and using SCCPCH as a radio physical channel. Since RNTI assigned from RAN is included in the "RRC Connection Setup" message for transmission, RRC Connection is established in signaling after that. Therefore, DCCH is used for logical channel transmission. The radio physical channel is transmitted on DPCH. When performing RRC Connection Setup Confirm, a transmission route to be prepared is SDCCH (for signaling), and a radio channel for U-plane transmission is not prepared. Therefore, when performing RRC Connection Setup, the radio channel is changed in RRC signaling. A radio physical channel for U-plane transmission is set by Radio Bearer Setup. That is, a channel is added by the RRC signaling.

A channel assignment method in PDC is described (refer to non-patent document 3, for example).

There are following function channels in PDC. That is, there are traffic channels (TCH) for transmitting user information and control channels (CCH). The control channels include BCCH, CCCH (PCH, SCCH), UPCH and ACCH (SACCH, FACCH).

In PDC, the function channels are mapped to one radio channel. On the radio channel, locations (slots) where the traffic channels (TCH) and control channels (CCH) can be mapped are limited in terms of time. In addition, only one type of function channel can be mapped to slots where the control channels can be mapped.

[non-patent document 1] 3GPP "TS25.301"
[non-patent document 2] 3GPP "TS25.321"
[non-patent document 3] RCR STD-27 PERSONAL DIGITAL CELLULAR TELECOMMUNICATION SYSTEM

DISCLOSURE OF THE INVENTION

Problem to be Solved by the Invention

However, in the above-mentioned background art, there are following problems.

In W-CDMA, there are three channel layers of logical channels, transport channels and physical channels. A logical channel is mapped to a transport channel, and a transport channel is mapped to a physical channel.

Almost all of logical channels can be assigned to SCCPCH (low speed radio physical channel basically). However, DCCH and DTCH can be mapped not only to FACH(SCCPCH), but also to DPCH (DCH) or HS-DSCH (HS-PDSCH). Therefore, as protocol states, states called CELL_FACH and CELL_DCH are defined, and transition among the states occurs by L3 signaling according to traffic amounts. Thus, it is necessary to define the protocol states (CELL_FACH and CELL_DCH), which causes increase of the number of test processes, increase of signaling (procedures and messages) for causing transition among protocol states, channel transition delay and data loss.

On the other hand, almost all of logical channels can be transmitted on the SCCPCH basically. But, UE that receives a signal on the SCCPCH basically receives the radio channel continuously, and after demodulating data, the UE discards corresponding TB when the data is not addressed to the own UE. Thus, battery consumption becomes a problem especially for a case of U-plane data.

In addition, PS (Packet Switched)-oriented data communication society will come with the development of multimedia communications technology in the future, and, when high speed data transmission is necessary, SCCPCH does not match the mobile communication environment in the future since SCCPCH is basically a low speed common channel (channel that all UE in the cell can receive).

In W-CDMA, the radio physical channel is clearly defined by code, and the resources cannot be shared among channels.

Only HS-DSCH (transport channel) can be mapped to HS-PDSCH (physical channel), and any other transport channel (such as PCH and BCH, for example) cannot be mapped. Only DCCH and DTCH can be mapped to HS-DSCH, and other logical channels cannot be mapped to HS-DSCH since identification of UE in the L2 level is difficult. Therefore, even though there are available resources, required resources cannot be assigned to the other logical channels.

Considering connection sequences, as to signaling in the RRC Connection establishment process, CCCH (common control channel) is transmitted using PRACH in an uplink communication, and is transmitted using SCCPCH in a returning downlink communication. As to signaling after RRC Connection is established, DCCH is transmitted on DPCH. Accordingly, in W-CDMA, radio physical channels are defined according to characteristics of logical channels, and change of radio physical channels is performed in the signaling of RRC. In addition, in W-CDMA, since a logical channel (bearer) for U-plane transmission is added after signaling, L3 signaling is also used for that.

Before establishment of RRC Connection, identification of UE is performed using an identifier of L3 (TMSI in particular). After establishment of RRC Connection, identification of UE is performed using an identifier of L2 (RNTI in particular). Therefore, transition to a dedicated channel can be performed only in a state after RRC Connection is established. Therefore, since UE identification methods in signaling are different between in RRC Connection establishment process and after that, the channel of the radio physical layer is reconfigured in W-CDMA. In accordance with that, there is necessity to define protocol states.

On the other hand, in PDC, although function channels are mapped to one radio channel, the control channel cannot be placed in slots for communication channel. On the other hand, a communication channel cannot be placed in slots for control channel. Therefore, when there is no information to be transmitted using the slots of the control channel, waste of resources occurs. In addition, since only one type of function channel can be placed in slots where the control channel can be placed, a plurality of types of function channels cannot be placed. Therefore, only by the one type of function channel, surplus of resources occurs and waste of resources occurs since transmission speed increases in a mobile communication system after 3G.

An object of the present invention is to provide a channel assignment apparatus and a channel assignment method that can sequentially assign radio resources on a radio physical channel according to occurrence of traffic on logical channels.

Means for Solving the Problem

For solving the problem, the channel assignment apparatus of the present invention is a channel assignment apparatus for assigning a plurality of logical channels to a radio physical channel between a radio access network and a terminal, wherein, the logical channels includes a logical channel for control and a logical channel for data transmission, the radio physical channel can be commonly used for a plurality of logical channels, and one logical channel has a correspondence relationship with one radio physical channel, and the channel assignment apparatus includes, as one of characteristics: traffic monitoring detection means that detects occurrence of traffic of the logical channels; and logical channel assignment means that, according to occurrence of the traffic of the logical channels, sequentially assigns required resources on the radio physical channel to the logical channels.

By configuring like this, a plurality of logical channels are associated with one radio physical channel, so that, according to traffic occurrence in the logical channels, required radio resources can be sequentially assigned to the logical channels on the radio physical channel.

In addition, the channel assignment method of the present invention is a channel assignment method for assigning a plurality of logical channels to a radio physical channel between a radio access network and a terminal, wherein the logical channels include a logical channel for control and a logical channel for data transmission, the radio physical channel can be commonly used for a plurality of logical channels, and one logical channel has a correspondence relationship with one radio physical channel, and the channel assignment method includes, as one of characteristics: a detecting step of detecting occurrence of traffic of the logical channels; and an assigning step of, according to the occurrence of the traffic of the logical channels, sequentially assigning required resources on the radio physical channel to the logical channels.

By configuring like this, a plurality of logical channels are associated with one radio physical channel, so that, according to traffic occurrence in the logical channels, required radio resources can be sequentially assigned to the logical channels on the radio physical channel.

Effect of the Invention

According to an embodiment of the present invention, a channel assignment apparatus and a channel assignment method that can sequentially assign radio resources on a radio physical channel according to occurrence of traffic in logical channels can be provided.

DESCRIPTION OF REFERENCE SIGNS

100, $100_1$, $100_2$, $100_3$ transmission apparatus
200 radio network controller
300, $300_1$, $300_2$, $300_3$, $300_4$, $300_5$, $300_6$ receiving apparatus

PREFERRED EMBODIMENTS FOR CARRYING OUT THE INVENTION

Next, preferred embodiments for carrying out the present invention are described with reference to figures based on the following embodiments.

By the way, in all figures for describing the embodiments, same reference symbols are used for parts having same functions, and repeated descriptions are not provided.

Figure 2:
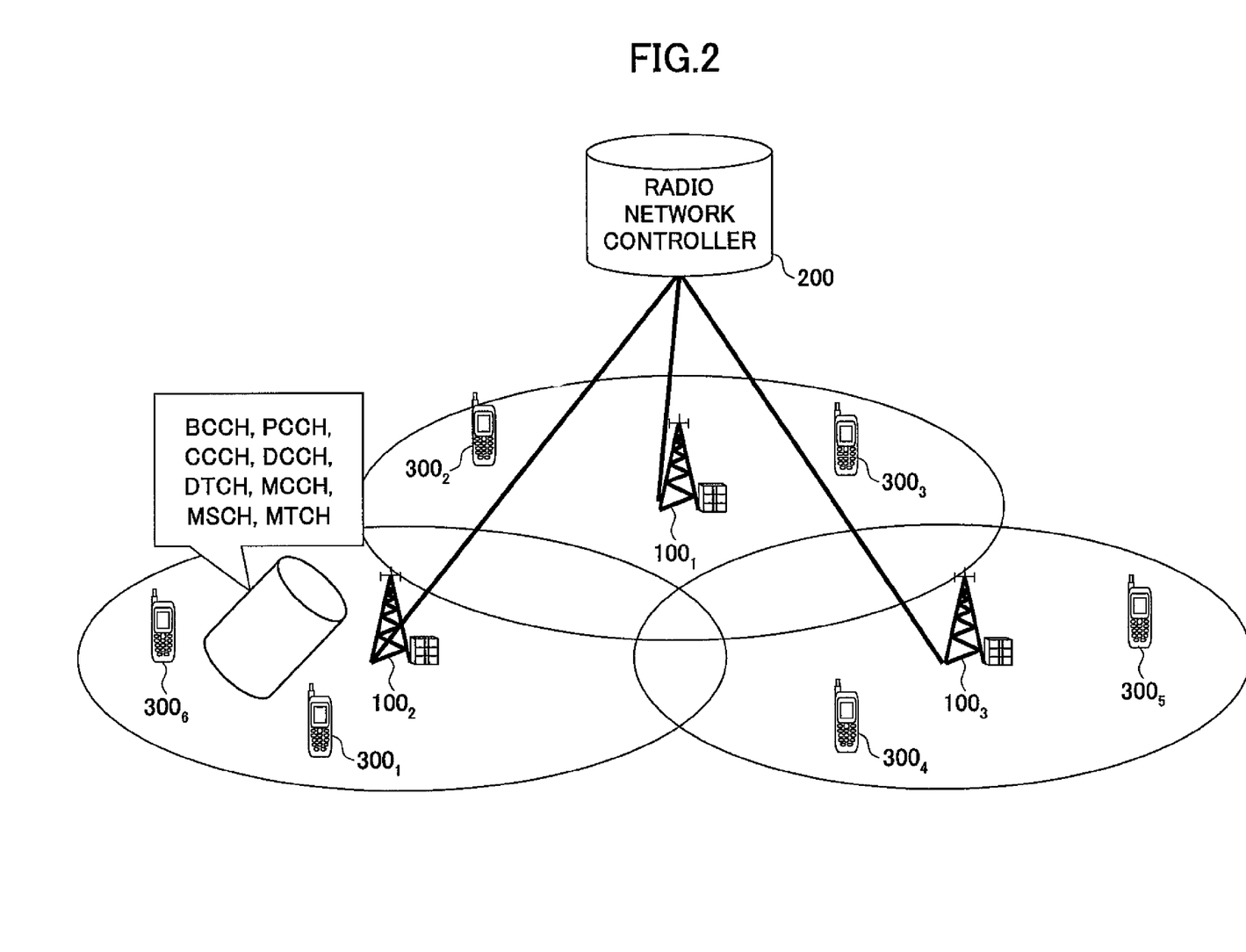
FIG. 2 is a schematic diagram showing a communication system according to an embodiment of the present invention.

A communication system according to an embodiment of the present invention is described with reference to FIG. 2.

The communication system (radio access network) assumed in the present embodiment includes a transmission apparatus 100 ($100_1$, $100_2$, $100_3$) a radio network controller 200 connected to the transmission apparatus 100, and a receiving apparatus 300 ($300_1$, $300_2$, $300_3$, $300_4$, $300_5$, $300_6$). The transmission apparatus 100 includes a channel assignment apparatus.

The communication system forms a service area (cell in the case of radio communication) to enable the transmission apparatus 100 and the receiving apparatus 300 to perform exchange of information.

A radio channel that can be shared by a plurality of receiving apparatuses is defined as a channel for transmission from the transmission apparatus 100 to the receiving apparatus 300 between the transmission apparatus 100 and the receiving apparatus 300. Every logical channel can be transmitted using this radio channel.

Although the transmission apparatus 100 and the receiving apparatus 300 are defined as a transmission apparatus and a receiving apparatus that transmit information via a radio link in the present embodiment, a transmission route between the transmission apparatus and the receiving apparatus is not limited to radio.

In addition, although transmission in a downlink direction from the transmission apparatus 100 to the receiving apparatus 300 is particularly described in the present embodiment, the present embodiment can be also applied to transmission in an uplink direction from the receiving apparatus 300 to the transmission apparatus 100 and is not limited to transmission in the downlink direction.

Figure 3:
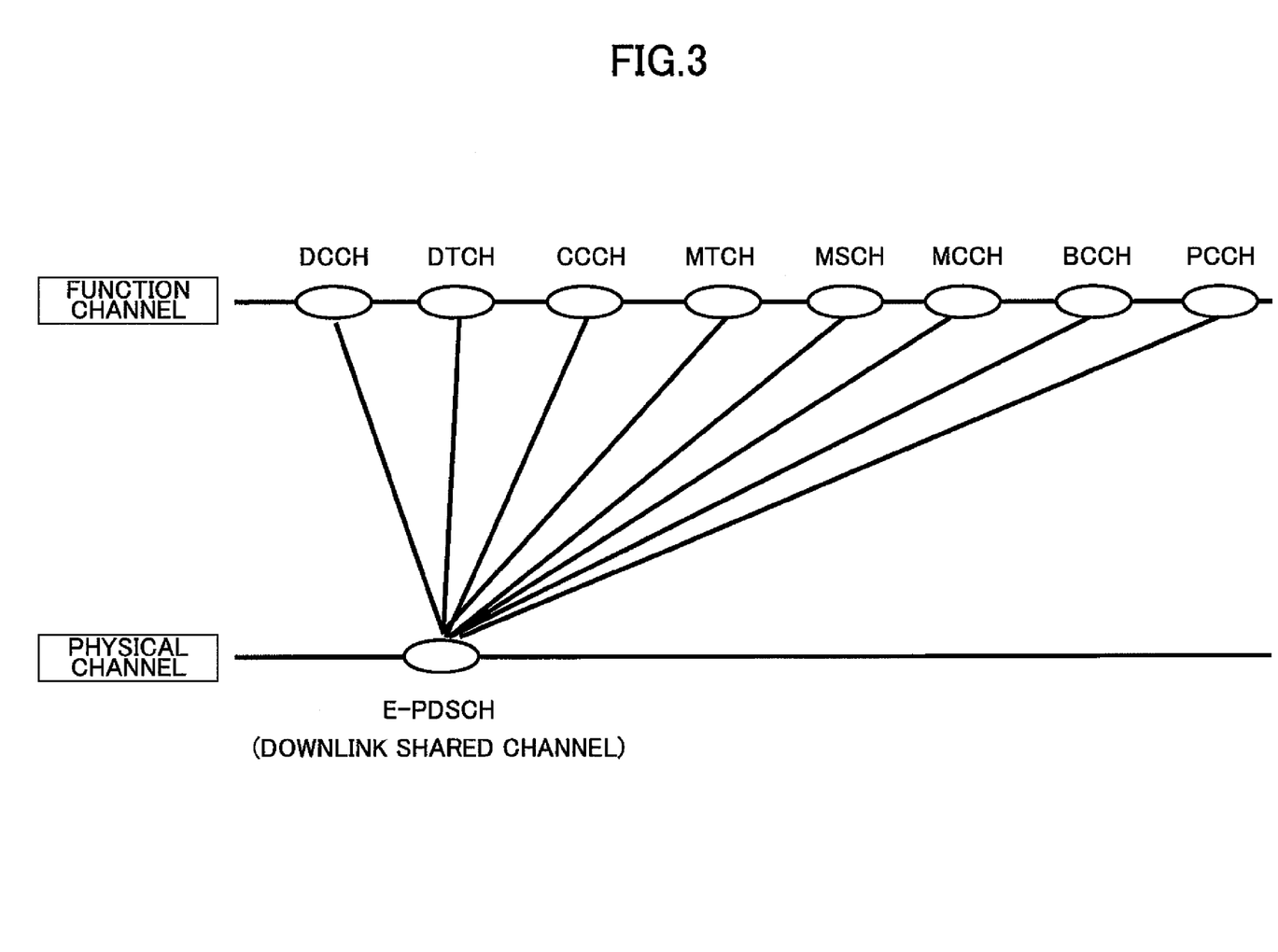
FIG. 3 is a schematic diagram showing correspondences between function channels and a physical channel in a communication system according to an embodiment of the present invention.

Next, correspondences between function channels and a physical channel, and a radio physical channel configuration that are assumed in the present embodiment are described with reference to FIG. 3.

The image of correspondences between logical channels (or function channels) and a physical channel assumed in the present embodiment is described using logical channels and a radio physical channel provided in W-CDMA.

The logical channels (or function channels) assumed in the present embodiment includes BCCH, PCCH, MCCH, DCCH, CCCH, DTCH, MSCH and MTCH. CCH indicates a logical channel for control and TCH indicates a logical channel for data transmission. MCCH, MSCH and MTCH are used for MBMS communication, that is, multicast broadcast communication. The logical channels are not limited to these, and may increase or decrease compared with these.

On the other hand, as a radio physical channel, E-DSCH (Evolution-Downlink Shared Channel) that is a downlink radio physical channel that can be shared among UEs is prepared. On the E-DSCH, all of the downlink logical channels of BCCH, PCCH, MCCH, DCCH, CCCH, MTCH, MSCH and DTCH can be transmitted. That is, the radio physical channel can be commonly used for a plurality of logical channels.

Although only E-DSCH is described as the radio physical channel, the radio physical channel is not limited to this, and there are a control channel associated with E-DSCH and an uplink channel. Each of BCCH, PCCH, MCCH, DCCH, CCCH, MSCH, MTCH and DTCH has a unique correspondence relationship with the E-PDSCH. That is, one logical channel has a correspondence relationship with one radio channel.

Although the present embodiment is described focusing on the downlink channels, it is not limited to the downlink channels.

In addition, transport channels defined in W-CDMA are not described. That is, a configuration may be adopted in which there is a transport channel between a logical channel and a physical channel, or a configuration may be adopted in which there is no transport channel between a logical channel and a physical channel. In the case in which there is the transport channel, a plurality of logical channels may be mapped to one transport channel or may be distributed to a plurality of transport channels.

Figure 4:
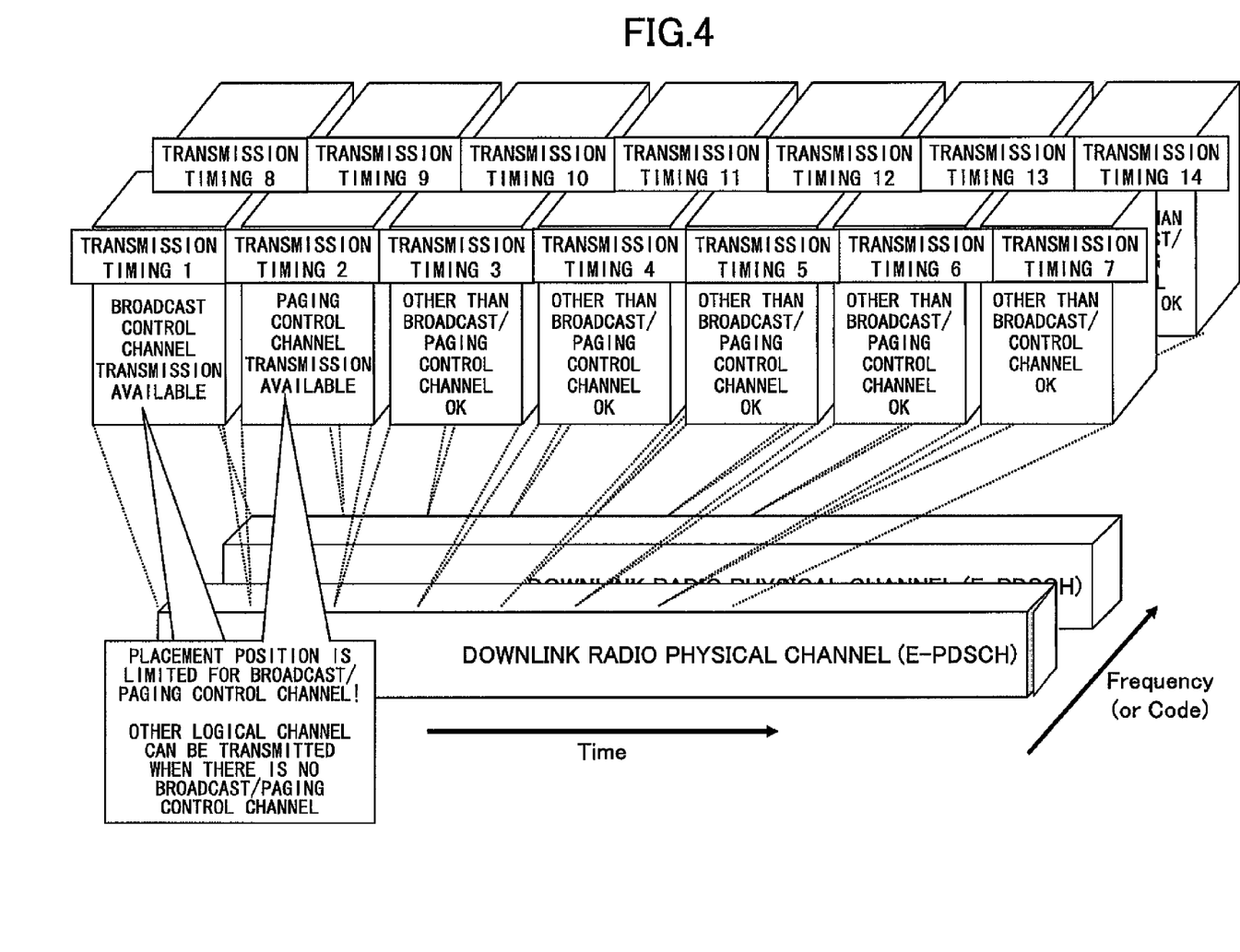
FIG. 4 is a schematic diagram showing a configuration of a radio physical channel according to an embodiment of the present invention.

Next, a configuration of a radio physical channel assumed in the present embodiment is described with reference to FIG. 4.

It is assumed that positions, on the radio physical channel (E-DSCH), at which required radio resources can be assigned to corresponding logical channels are transmission timing 1-transmission timing 14. The number of the transmission timings is not limited to 14, and may be more than that or smaller than that. In addition, the radio physical channel is divided by code so that a plurality of radio physical channels can be provided.

For example, at the transmission timing 1, when there is traffic of the broadcast control channel (BCCH), required radio resources can be assigned to the BCCH. That is, the broadcast control channel (BCCH) can be assigned to a particular position on the radio physical channel, for example, to the transmission timing 1. But, when there is no traffic of the BCCH, if traffic occurs in a logical channel other than the broadcast control channel or the paging control channel, required radio resources can be assigned to the logical channel at the transmission timing 1.

In addition, for example, at transmission timing 2, when there is traffic of the paging control channel (PCCH), it is possible to assign required radio resources to the PCCH. That is, the paging control channel (PCCH) can be assigned to a particular position on the radio physical channel, that is, assigned to the transmission timing 2, for example. But, when there is no traffic of the PCCH, if traffic occurs in a logical channel other than the broadcast control channel or the paging control channel, required radio resources can be assigned to the logical channel at the transmission timing 2.

At each transmission timing other than the transmission timings 1 and 2, as for every logical channel other than BCCH or PCCH, when traffic occurs in a logical channel, required radio resources can be assigned to the logical channel. That is, a logical channel other than the logical channels used for the broadcast information and the paging information can be assigned to an arbitrary position of the radio physical channel.

Figure 5:
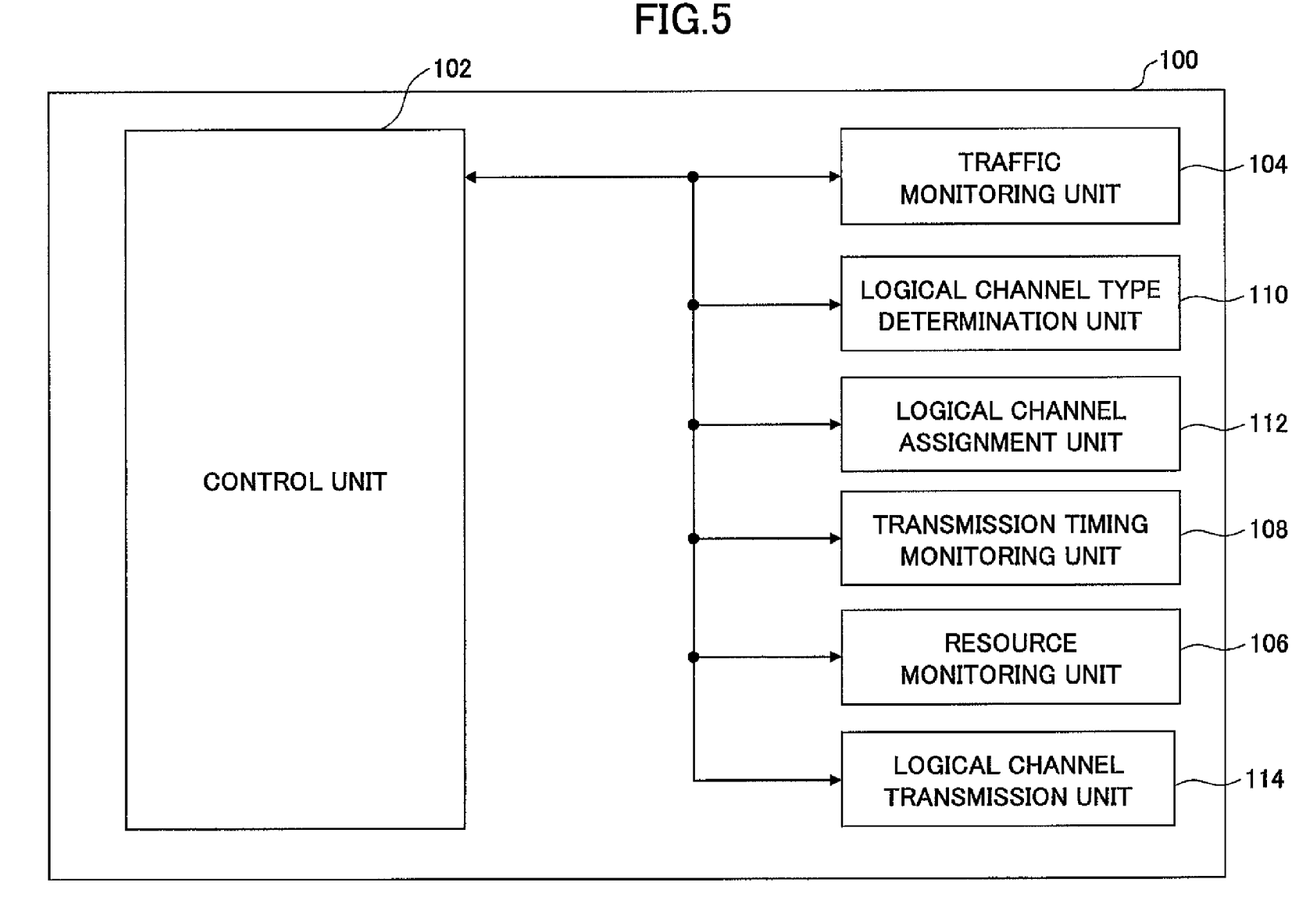
FIG. 5 is a block diagram showing a transmission apparatus according to an embodiment of the present invention.

Next, a transmission apparatus of the present embodiment is described with reference to FIG. 5.

The transmission apparatus 100 of the present embodiment includes a channel assignment apparatus. The channel assignment apparatus includes a control unit 102, and a traffic monitoring unit 104, a resource monitoring unit 106, a transmission timing monitoring unit 108, a logical channel type determination unit 110, a logical channel assignment unit 112 and a logical channel transmission unit 114 that are connected to the control unit 102. The radio assignment apparatus assigns, to a radio physical channel, a plurality of logical channels necessary for establishing radio links, maintaining the radio links and transmitting data between a radio access network (RAN) and a terminal (UE).

The control unit 102 performs control on each function entity to control the transmission apparatus 100 as a whole.

The traffic monitoring unit 104 performs monitoring to determine whether there is a logical channel in which traffic occurs among logical channels that can be mapped to the radio physical channel.

The resource monitoring unit 106 performs monitoring to determine whether resources can be assigned to the logical channel in which traffic occurs.

The transmission timing monitoring unit 108 performs monitoring to determine whether the broadcast control channel or the paging control channel can be assigned at timings when each logical channel can be assigned.

The logical channel type determination unit 110 determines a logical channel type of the logical channel monitored by the traffic monitoring unit 104.

When it becomes possible to assign required resources to a logical channel according to the results of the traffic monitoring unit 104, the logical channel type determination unit 110, the transmission timing monitoring unit 118 and the resource monitoring unit 106, the logical channel assignment unit 112 assigns resources for the logical channel on the radio physical channel.

The logical channel transmission unit 114 transmits the assigned logical channel to the receiving apparatus 300.

Figure 6:
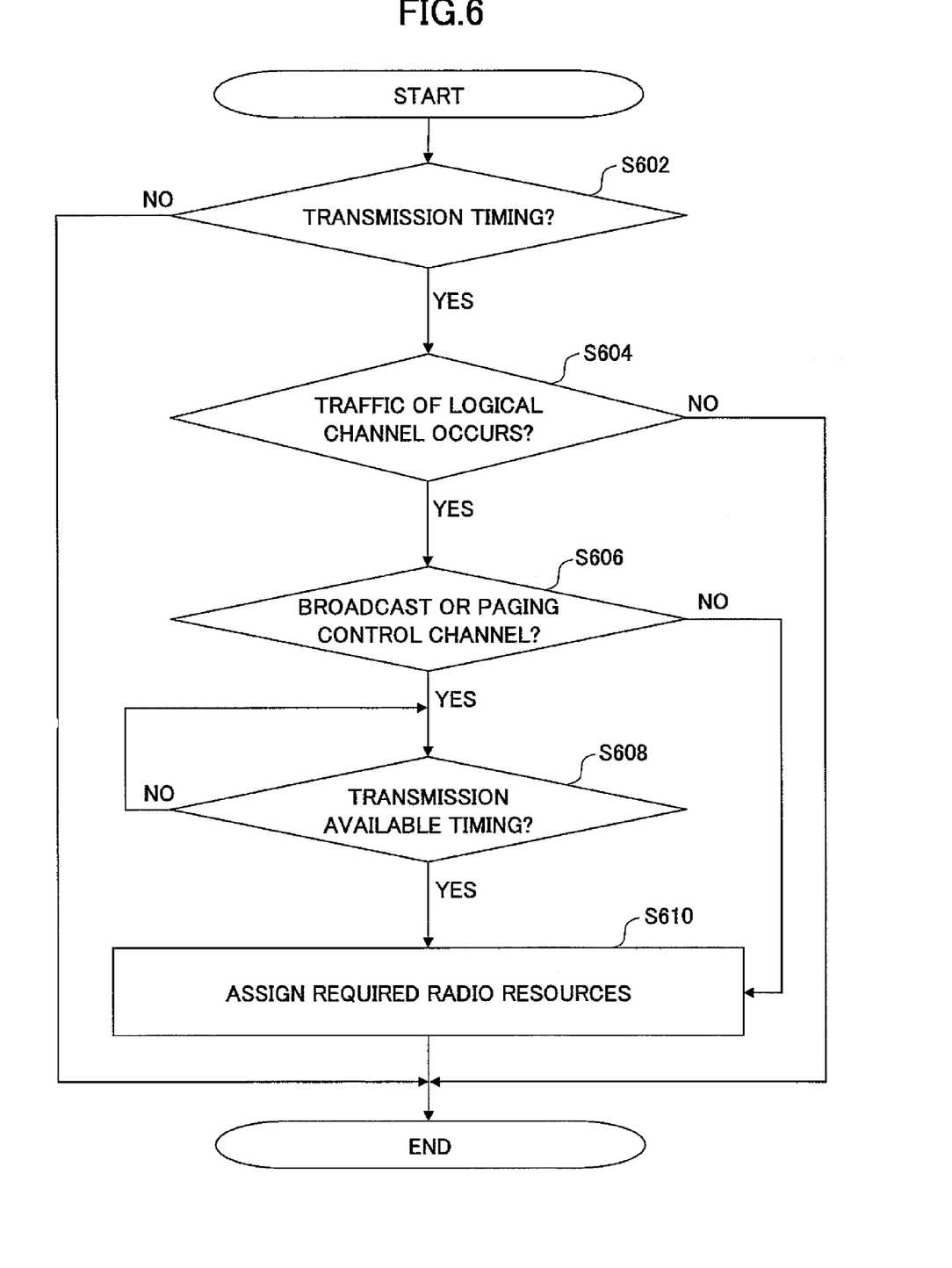
FIG. 6 is a flowchart showing operation of the transmission apparatus according to an embodiment of the present invention.

Next, channel assignment processes in the transmission apparatus 100 of the present embodiment is described with reference to FIG. 6.

The transmission timing monitoring unit 108 of the transmission apparatus 100 checks whether now is a transmission available timing (step S602).

When it is the transmission available timing (step S602: YES), the traffic monitoring unit 104 determines whether there is a logical channel in which traffic occurs among logical channels (step S604). When it is not the transmission available timing (step S602: NO), the process ends.

When there is a logical channel in which traffic occurs (step S604: YES), the logical channel type determination unit 110 determines whether the logical channel is at least one of the broadcast control channel and the paging control channel (step S606). When there is no logical channel in which traffic occurs (step S604: NO), the process ends.

When the logical channel in which traffic occurs is at least one of the broadcast control channel and the paging control channel (step S606: YES), the transmission timing monitoring unit 108 determines whether the broadcast control channel or the paging control channel can be transmitted at the transmission timing (step S608).

When it can be transmitted at the transmission timing (step S608: YES), the logical channel assignment unit 112 assigns required radio resources on the radio physical channel to the logical channel (step S610).

On the other hand, as a result of the determination in step S606, when the logical channel is neither the broadcast control channel nor the paging control channel (step S606: NO), the logical channel assignment unit 112 immediately assigns required resources on the radio physical channel to the logical channel (step S610).

In addition, as a result of the determination in step S608, when it cannot be transmitted at the timing (step S608: NO), the transmission timing monitoring unit 108 once stores information until next transmission available timing, that is, the process returns to step S608, and the logical channel assignment unit 112 assigns radio resources on the radio physical channel to the logical channel immediately when the time becomes the transmission available timing.

Next, a communication system of a second embodiment of the present invention is described.

Since the configuration of the communication system according to the present embodiment is similar to the communication system of the first embodiment, it is not described.

Next, the transmission apparatus 100 of the present embodiment is described.

The configuration of the transmission apparatus of the present embodiment is similar to the configuration of the transmission apparatus of the first embodiment described with reference to FIG. 5. However, the transmission timing monitoring unit 108 performs monitoring of a logical channel used for user common data information such as a MBMS channel for example, in addition to monitoring of the broadcast control channel and the paging control channel.

Next, correspondences between function channels and a physical channel and a configuration of the physical channel that are assumed in the present embodiment are described.

The correspondences between the function channels and the physical channel that are assumed in the present embodiment are similar to the correspondences between the function channels and the physical channel of the first embodiment described with reference to FIG. 3. However, the physical channel configuration is different from that of the first embodiment in that, when performing MBMS communications, positions to which required resources can be assigned on the radio physical channel for MCCH, MSCH and MTCH (logical channels for multicast/broadcast) are limited. That is, user common data information such as a logical channel used for MBMS, for example, is assigned to a particular position on the radio physical channel. Since the user common data information that is multicast broadcast information, for example, can be transmitted from adjacent transmission apparatuses simultaneously, it can be transmitted only at a transmission timing determined among the adjacent transmission apparatuses.

Figure 7:
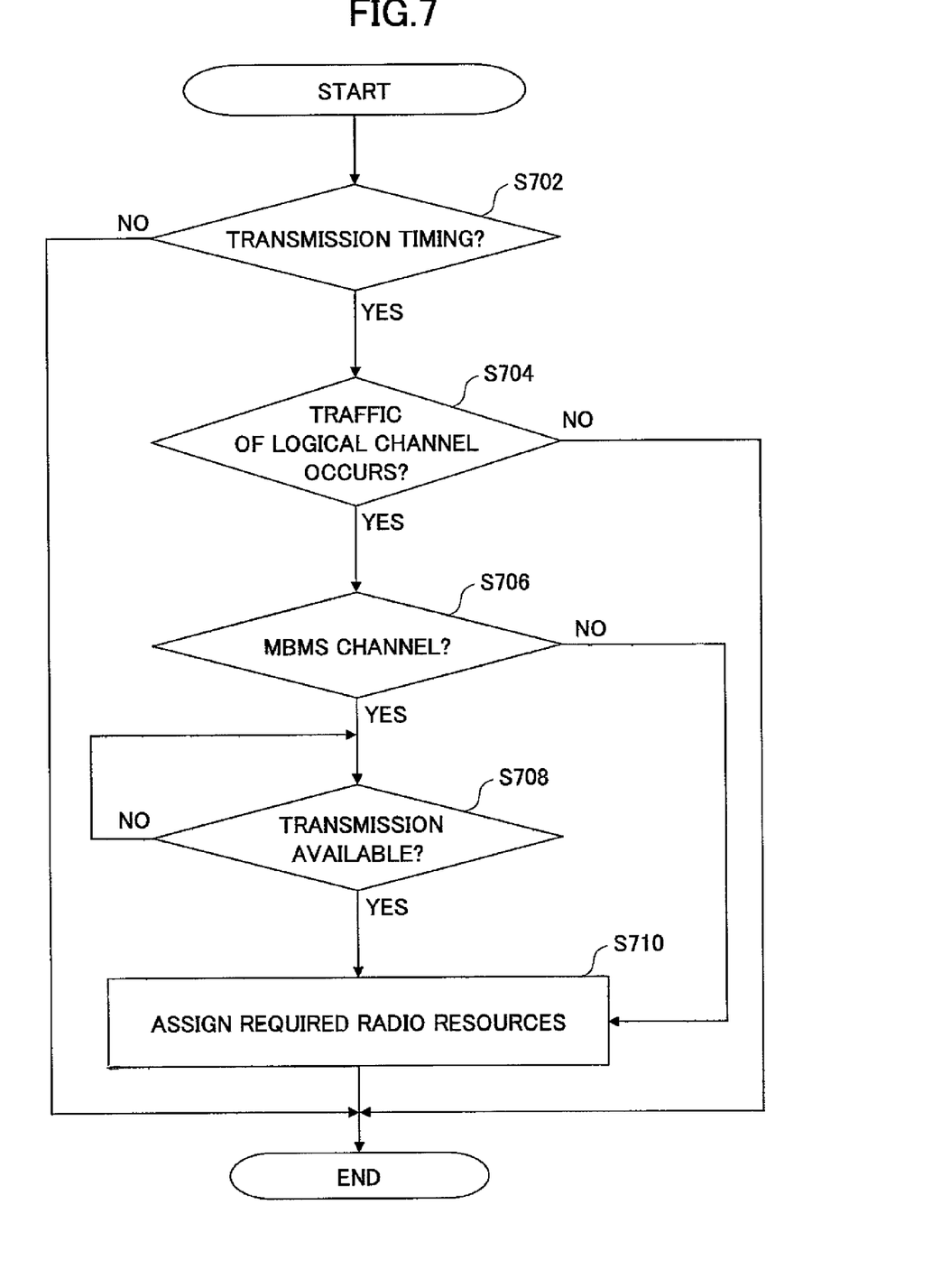
FIG. 7 is a flowchart showing operation of the transmission apparatus according to an embodiment of the present invention.

Next, channel assignment processes in the transmission apparatus 100 of the present embodiment are described with reference to FIG. 7.

The transmission timing monitoring unit 108 of the transmission apparatus 100 checks whether now is a transmission available timing (step S702).

When it is the transmission available timing (step S702: YES), the traffic monitoring unit 104 determines whether there is a logical channel in which traffic occurs among logical channels (step S704). When it is not the transmission available timing (step S702: NO), the process ends.

When there is the logical channel in which traffic occurs (step S704: YES), the logical channel type determination unit 110 determines whether the logical channel is user common data information that is a logical channel for MBMS, for example (step S706). When there is no logical channel in which traffic occurs (step S704: NO), the process ends.

When the logical channel is the logical channel for MBMS (step S706: YES), the transmission timing monitoring unit 108 determines whether the logical channel for MBMS can be transmitted at the transmission timing (step S708).

When it can be transmitted at the transmission timing (step S708: YES), the logical channel assignment unit 112 assigns required radio resources on the radio physical channel to the logical channel (step S710).

On the other hand, as a result of the determination in step S706, when the logical channel is not the logical channel for MBMS (step S706: NO) the logical channel assignment unit 112 immediately assigns required resources on the radio physical channel to the logical channel (step S710).

In addition, as a result of the determination in step S70, when it cannot be transmitted at the timing (step S708: NO), the transmission timing monitoring unit 108 once stores the multicast broadcast information until next transmission available timing, that is, the process returns to step S708, and the logical channel assignment unit 112 assigns radio resources for MBMS on the radio physical channel immediately to the logical channel when the time becomes the transmission available timing.

Next, a communication system of a third embodiment of the present invention is described.

Since the configuration of the communication system according to the present embodiment is similar to the communication system of the first embodiment described with reference to FIG. 2, it is not described.

Next, the transmission apparatus 100 of the present embodiment is described.

The configuration of the transmission apparatus of the present embodiment is similar to the configuration of the transmission apparatus of the first embodiment described with reference to FIG. 5. However, the transmission timing monitoring unit 108 performs monitoring of a logical channel used for user common data information that is monitoring of a MBMS channel, for example, in addition to monitoring of the broadcast control channel and the paging control channel.

Next, correspondences between function channels and a physical channel, and a configuration of the physical channel that are assumed in the present embodiment are described.

The correspondences between the function channels and the physical channel of the present embodiment are similar to the correspondences between the function channels and the physical channel of the first embodiment described with reference to FIG. 3. However, in each transmission timing, required radio resources are assigned to a logical channel in which traffic occurs, and when there are available radio resources remained, if the remained radio resources are adequate for required radio resources for another logical channel, the required radio resources are assigned to the logical channel. That is, the physical channel configuration is different from that of the first embodiment in that, the number of the logical channels that can be assigned required radio resources at a transmission timing is not limited to one, and a plurality of logical channels can be transmitted as long as radio resources remain.

As to positions to which required radio resources can be assigned for the broadcast control channel and the paging control channel, when required radio resources are already assigned to the broadcast control channel and the paging control channel, radio resources are not assigned to other logical channels even though there are available radio resources remained. This is similar to the logical channel for MBMS. However, when code division or frequency division are performed, required radio resources can be assigned to the other logical channel on the radio physical channel defined by different code/frequency at a same timing.

Figure 8:
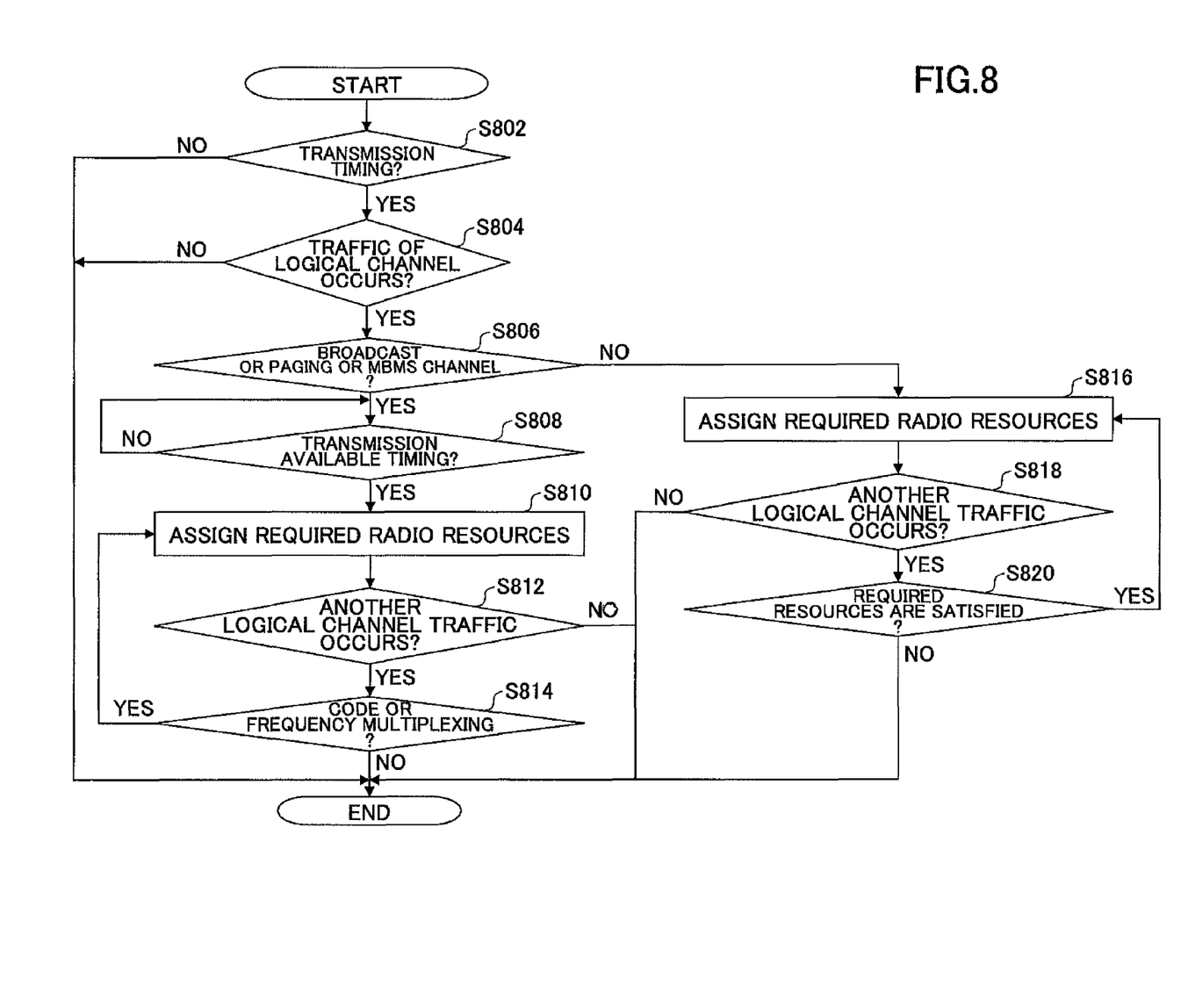
FIG. 8 is a flowchart showing operation of the transmission apparatus according to an embodiment of the present invention.

Next, channel assignment processes in the transmission apparatus 100 of the present embodiment are described with reference to FIG. 8.

The transmission timing monitoring unit 108 of the transmission apparatus 100 checks whether now is a transmission available timing (step S802).

When it is the transmission available timing (step S802: YES), the traffic monitoring unit 104 determines whether there is a logical channel in which traffic occurs among logical channels (step S804). When it is not the transmission available timing (step S802: NO), the process ends.

When there is the logical channel in which traffic occurs (step S804: YES), the logical channel type determination unit 110 determines whether the logical channel is at least one of the broadcast control channel, the paging control channel, and user common data information that is a logical channel for MBMS, for example (step S806). When there is no logical channel in which traffic occurs (step S804: NO), the process ends.

When the logical channel is at least one of the broadcast control channel, the paging control channel, and the logical channel for MBMS (step S806: YES), the transmission timing monitoring unit 108 determines whether any one of the broadcast control channel, the paging control channel, and the logical channel for MBMS can be transmitted at the transmission timing (step S808).

When it can be transmitted at the transmission timing (step S808: YES), the logical channel assignment unit 112 assigns required radio resources on the radio physical channel to the logical channel (step S810).

Next, the traffic monitoring unit 104 checks whether there is another logical channel in which traffic occurs (step S812).

When there is the another logical channel in which traffic occurs (step S812: YES), the resource assignment unit 106 checks whether the radio physical channel is code-divided or frequency-divided or the like in the radio system (step 814).

When code division or frequency division is performed (step S814: YES), the logical channel assignment unit 112 assigns required radio resources to the logical channel (step S810). However, when the logical channel in which the traffic occurs is the broadcast control channel, the paging control channel, or the logical channel for MBMS, the above-mentioned step is performed, that is, processes similar to step S808 are performed.

When the logical channel is not any one of the broadcast control channel, the paging control channel and the logical channel for MBMS according to the result of the determination in step S806 (step S806: NO), the logical channel assignment unit 112 immediately assigns required radio resources on the radio physical channel to the logical channel (step S816).

Next, the traffic monitoring unit 104 checks whether there is another logical channel in which traffic occurs (step S818).

When there is the logical channel in which traffic occurs (step S818: YES), the resource monitoring unit 106 determines whether there are enough required resources requested by the logical channel (step S820).

When the resources requested by the logical channel can be kept (step S820: YES), the logical channel assignment unit 112 immediately assigns the required resources to the logical channel (step S816). But, when the logical channel in which traffic occurs is any one of the broadcast control channel, the paging control channel and the channel for MBMS, processes similar to the above-mentioned step that is step S808 are performed.

In addition, according to the result of the determination in step S808, when it cannot be transmitted at the timing (step S808: NO), the logical channel assignment unit 112 once stores information of the broadcast control channel, the paging control channel or the channel for MBMS until next transmission available timing, that is, the process returns to step S808, and the logical channel assignment unit 112 assigns radio resources for the broadcast information, the paging information or MBMS on the radio physical channel immediately when transmission can be available.

In addition, according to the results of determination in steps S812 and S818, when there is no other logical channel in which traffic occurs (step S812, step S818: NO), the process ends.

According to the result of determination in step S814, when there is nothing by which resources can be kept (step S804: NO), the resources are not kept for the logical channel, and the process ends. Occurring traffic is assigned in a next transmission timing.

In addition, according to the result of determination in step S820, when required resources requested by the logical channel cannot be kept (step S820: NO), required resources are not assigned to the logical channel, and the process ends. Required resources are assigned at a next transmission timing to the logical channel to which resources was not assigned.

As mentioned above, according to the present embodiment, by transmitting a plurality of function channels (logical channels) using one physical channel, an effect that signaling (channel transition procedures, messages) can be reduced can be expected.

In addition, an effect of decreasing protocol states and an effect of decreasing test processes can be obtained, and transition delay and data loss due to channel transition can be avoided.

In addition, an effect for simplifying correspondences among channels can be expected.

In addition, since resource assignment is performed successively on the radio channel according to traffic occurrence, waste of resources (code, time, frequency and the like) does not occur so that an effect that the resources can be used effectively can be expected. An effect can be expected in which it becomes unnecessary to define locations of function channels on the radio channel beforehand.

INDUSTRIAL APPLICABILITY

The channel assignment apparatus and the channel assignment method of the present invention can be applied to a mobile communication system.

The present application claims priority based on Japanese patent application No. 2005-178530, filed in the JPO on Jun. 17, 2005 and the entire contents of the Japanese patent application No. 2005-178530 are incorporated herein by reference.

The invention claimed is:

1. A channel assignment apparatus configured to assign a plurality of logical channels to a radio physical channel between a radio access network and a terminal, wherein the logical channels include a logical channel for control and a logical channel for data transmission, wherein the radio physical channel is commonly used for a plurality of logical channels, wherein each logical channel has a correspondence relationship with one radio physical channel, and wherein the radio physical channel includes a particular time position at which a particular type of logical channel is placed and other time positions for placing logical channels other than the particular type of logical channel, the channel assignment apparatus comprising:
  a traffic monitoring detection unit configured to detect occurrence of traffic of the logical channels;
  a logical channel type determination unit configured to determine types of the logical channels; and
  a logical channel assignment unit configured to assign radio resources on the radio physical channel to the logical channels,
  wherein the logical channel assignment unit, if traffic occurs in a specific logical channel other than the particular type of logical channel, assigns the specific logical channel other than the particular type of logical channel to the particular time position on the radio physical channel when there is no traffic of the particular type of logical channel at a transmission timing corresponding to the particular time position and assigns, after the specific logical channel other than the particular type of logical channel is assigned to the particular time position, the specific logical channel other than the particular type of logical channel to a time position other than the particular time position at a transmission timing corresponding to the time position other than the particular time position,
  wherein the logical channel assignment unit, if traffic occurs in the particular type of logical channel other than the specific logical channel, assigns the particular type of logical channel other than the specific logical channel to the particular time position on the radio physical channel,
  wherein, after the particular type of logical channel other than the specific logical channel is assigned to the particular time position on the radio physical channel, when the radio physical channel is frequency-divided or code-divided, the logical channel assignment unit assigns the specific logical channel other than the particular type of logical channel to the particular time position, that is already assigned to the particular type of logical channel, on the radio physical channel defined by different frequency or code by frequency-multiplexing or code-multiplexing according to occurrence of traffic on the specific logical channel other than the particular type of logical channel.

2. The channel assignment apparatus as claimed in claim 1, wherein the logical channel assignment unit sequentially assigns the radio physical channel to the logical channels according to the types of the logical channels.

3. The channel assignment apparatus as claimed in claim 2, wherein, the logical channel assignment unit assigns the particular type of logical channel logical channel used for one of broadcast information and paging information or the specific logical channel used for user common data information to the particular time position on the radio physical channel.

4. The channel assignment apparatus as claimed in claim 3, wherein the logical channel assignment unit assigns the specific logical channel other than the particular type of logical channel used for one of the broadcast information and the paging information to an arbitrary time position of the radio physical channel.

5. The channel assignment apparatus as claimed in claim 2, wherein, the logical channel assignment unit assigns the specific logical channel other than the particular type of logical channel used for one of broadcast information and paging information to an arbitrary time position of the radio physical channel.

6. A channel assignment method of assigning a plurality of logical channels to a radio physical channel between a radio access network and a terminal, wherein the logical channels include a logical channel for control and a logical channel for data transmission, wherein the radio physical channel is commonly used for a plurality of logical channels, wherein each logical channel has a correspondence relationship with one radio physical channel, and wherein the radio physical channel includes a particular time position at which a particular type of logical channel is placed and other time positions for placing logical channels other than the particular type of logical channel, the channel assignment method comprising:
  detecting occurrence of traffic of the logical channels;
  determining types of the logical channels; and
  assigning radio resources on the radio physical channel to the logical channels,
  wherein if traffic occurs in a specific logical channel other than the particular type of logical channel, the specific logical channel other than the particular type of logical channel is assigned to the particular time position on the radio physical channel when there is no traffic of the particular type of logical channel at a transmission timing corresponding to the particular time position and assigning, after the specific logical channel other than the particular type of logical channel is assigned to the particular time position, the specific logical channel other than the particular type of logical channel to a time position other than the particular time position at a transmission timing corresponding to the time position other than the particular time position, wherein if traffic occurs in the particular type of logical channel other than the specific logical channel, the particular type of logical channel other than the specific logical channel is assigned to the particular time position on the radio physical channel, wherein, after the particular type of logical channel other than the specific logical channel is assigned to the particular time position on the radio physical channel, when the radio physical channel is frequency-divided or code-divided, the specific logical channel other than the particular type of logical channel is assigned to the particular time position, that is already assigned to the particular type of logical channel, on the radio physical channel defined by different frequency or code by frequency-multiplexing or code-multiplexing according to occurrence of traffic on the specific logical channel other than the particular type of logical channel.

7. The channel assignment method as claimed in claim 6, wherein the assigning sequentially assigns the radio physical channel to the logical channels according to the types of the logical channels.

8. The channel assignment method as claimed in claim 7, wherein the assigning includes assigning the particular type of logical channel logical channel used for one of broadcast information and paging information or the specific logical channel used for user common data information to the particular time position on the radio physical channel.

9. The channel assignment method as claimed in claim 8, wherein the assigning includes assigning the specific logical channel other than the particular type of logical channel used for one of the broadcast information and the paging information to an arbitrary time position of the radio physical channel.

10. The channel assignment method as claimed in claim 7, wherein the assigning includes assigning the specific logical channel other than the particular type of logical channel used for one of broadcast information and paging information to an arbitrary time position of the radio physical channel.

* * * * *